(12) United States Patent
Hasecke et al.

(10) Patent No.: US 12,143,892 B2
(45) Date of Patent: Nov. 12, 2024

(54) METHOD, DEVICE, AND COMPUTER PROGRAM FOR DETERMINING A CHANGE IN POSITION AND/OR ORIENTATION OF A MOBILE APPARATUS

(71) Applicant: Aptiv Technologies AG, Schaffhausen (CH)

(72) Inventors: Frederik Lenard Hasecke, Solingen (DE); Sönke Behrends, Düsseldorf (DE)

(73) Assignee: Aptiv Technologies AG, Schaffhausen (CH)

( * ) Notice: Subject to any disclaimer, the term of this patent is extended or adjusted under 35 U.S.C. 154(b) by 387 days.

(21) Appl. No.: 17/646,605

(22) Filed: Dec. 30, 2021

(65) Prior Publication Data
US 2022/0217499 A1 Jul. 7, 2022

(30) Foreign Application Priority Data
Jan. 4, 2021 (EP) .................................... 21150051

(51) Int. Cl.
*H04W 4/02* (2018.01)
(52) U.S. Cl.
CPC ........... *H04W 4/027* (2013.01); *H04W 4/026* (2013.01)
(58) Field of Classification Search
CPC ............................. H04W 4/027; H04W 4/026
See application file for complete search history.

(56) References Cited

U.S. PATENT DOCUMENTS

| 8,665,263 | B2 | 3/2014 | Yoshida et al. |
| 10,482,674 | B1 * | 11/2019 | Wu .................. G09B 25/00 |
| 10,856,253 | B1 * | 12/2020 | Files ................ H04W 64/006 |
| 11,280,608 | B1 * | 3/2022 | Zermas ................ G01S 19/45 |

(Continued)

FOREIGN PATENT DOCUMENTS

| CN | 108648270 A | 10/2018 |
| CN | 110634183 A | 12/2019 |

(Continued)

OTHER PUBLICATIONS

"European Search Report", EP Application No. 21150051.7, Jun. 29, 2021, 9 pages.

(Continued)

*Primary Examiner* — Ernest G Tacsik
(74) *Attorney, Agent, or Firm* — Harness, Dickey & Pierce, P.L.C.

(57) ABSTRACT

The present disclosure relates to methods, devices, and computer programs for determining a change in a position and/or orientation of a mobile apparatus. In an aspect, described is a method of determining a change in a position and/or orientation of a mobile apparatus that includes: acquiring a first data stream indicating a first estimated change in at least one of a position or an orientation of the mobile apparatus in respective ones of a plurality of time frames; acquiring a second data stream indicating a second estimated change in the at least one of the position or the orientation of the mobile apparatus in the respective ones of the plurality of time frames; and determining a change in the at least one of the position or the orientation of the mobile apparatus using the first estimated change or the second estimated change.

14 Claims, 6 Drawing Sheets

(56) References Cited

U.S. PATENT DOCUMENTS

| | | | | |
|---|---|---|---|---|
| 2017/0178355 | A1* | 6/2017 | Alibay | G06T 7/70 |
| 2017/0371353 | A1* | 12/2017 | Millinger, III | G01S 19/15 |
| 2019/0356849 | A1* | 11/2019 | Sapienza | G06V 20/10 |
| 2020/0210701 | A1* | 7/2020 | Cui | G06V 10/809 |
| 2020/0217666 | A1* | 7/2020 | Zhang | G01C 21/383 |
| 2020/0265231 | A1* | 8/2020 | Li | G06V 20/64 |
| 2021/0185491 | A1* | 6/2021 | Chakraborty | G06F 18/22 |
| 2021/0190969 | A1* | 6/2021 | Best | G01S 19/42 |
| 2021/0262800 | A1* | 8/2021 | Levine | G02B 27/0172 |
| 2022/0161830 | A1* | 5/2022 | Devassy | B60W 50/0097 |
| 2022/0232169 | A1* | 7/2022 | Araújo | G06T 5/73 |
| 2022/0309698 | A1* | 9/2022 | Takahashi | G01B 11/00 |

FOREIGN PATENT DOCUMENTS

| | | |
|---|---|---|
| CN | 110780678 A | 2/2020 |
| CN | 111578957 A | 8/2020 |

OTHER PUBLICATIONS

Ho, et al., "Loop Closure Detection in SLAM by Combining Visual and Spatial Appearance", Robotics and Autonomous Systems 54, Jul. 27, 2006, 10 pages.

Karam, et al., "Strategies to Integrate IMU and Lidar Slam for Indoor Mapping", ISPRS Annals of the Photogrammetry, Remote Sensing and Spatial Information Sciences, vol. V-1-2020, XXIV ISPRS Congress (2020 edition); Dept. of Earth Observation Science, Faculty ITC, University of Twente, 2020, 8 pages.

Shan, et al., "LeGO-LOAM: Lightweight and Ground-Optimized Lidar Odometry and Mapping on Variable Terrain", 2018 IEEE/RSJ International Conference on Intelligent Robots and Systems (IROS), 2018, 8 pages.

Shan, et al., "LIO-SAM: Tightly-coupled Lidar Inertial Odometry via Smoothing and Mapping", 2020 IEEE/RSJ International Conference on Intelligent Robots and Systems (IROS), 2020, 8 pages.

Zhang, et al., "LOAM: Lidar Odometry and Mapping in Real-time", retrieved from https://www.ri.cmu.edu/pub_files/2014/7/Ji_LidarMapping_RSS2014_v8.pdf on Dec. 27, 2021, 9 pages.

Zhang, et al., "Visual-lidar Odometry and Mapping: Low-drift, Robust, and Fast", Retrieved from https://frc.ri.cmu.edu/~zhangji/publications/ICRA_2015.pdf on Dec. 27, 21, 2015, 8 pages.

Kechiche, et al., "A New Loose-Coupling Method for Vision-Inertial Systems Based on Retro-Correction and Inconsistency Treatment," École Nationale d'Ingenieurs Saint-Étienne (ENISE), retrieved from https://doi.org/10.007/978-3-030-25999-0_10, Jul. 28, 2019, 15 pages.

* cited by examiner

METHOD, DEVICE, AND COMPUTER PROGRAM FOR DETERMINING A CHANGE IN POSITION AND/OR ORIENTATION OF A MOBILE APPARATUS

CROSS-REFERENCE TO RELATED APPLICATION

This application claims priority to European Patent Application Number 21150051.7, filed Jan. 4, 2021 the disclosure of which is hereby incorporated by reference in its entirety herein.

BACKGROUND

A mobile device or apparatus, such as a vehicle or a robot, may autonomously move through an environment. A position and orientation of the mobile apparatus should be determined or estimated at respective points in time to determine a change in position and orientation while the mobile apparatus moves through the environment. Here, a position may refer to a two-dimensional position in a 2D coordinate system or a three-dimensional position in a 3D coordinate system. Further, an orientation may refer to one or more of yaw angle, a roll angle, and/or a pitch angle. A time-dependent change in position and orientation may also be referred to as ego-motion of the mobile apparatus.

Previous ego-motion estimation algorithms have relied on acceleration sensors which record the movement of the mobile apparatus (such as a robot or vehicle) in question. Alternatively, the mobile apparatus may also use a simultaneous localization and mapping (SLAM) based algorithm using camera images or LIDAR (light detection and ranging) point-clouds, e.g., in combination with image/point-cloud registration methods, to compare consecutive measurements and determine the change of the position and orientation of the mobile apparatus between these measurements.

Here, the SLAM-based algorithm may use one or more sensor data streams with regard to, for example, laser and/or radar scans, which provide details of many points within an area (point-clouds) around the mobile apparatus. Shapes in such point-clouds can be aligned at each step via image registration or image recognition.

There have also been attempts to feed the acceleration sensor data stream and the SLAM-based data stream into a Kalman filter or the like to determine or estimate a change in position or orientation a vehicle. These attempts have generally not provided significant improvements in accuracy of position or orientation prediction, likely due to the fact that the operation of the Kalman filter on two independent data streams of different accuracy and reliability is difficult to control.

Usually these kinds of algorithms may be fine-tuned by a loop closure algorithm, in which already seen areas are mapped to the same position when the mobile apparatus (also referred to as ego-instance) loops back to a position that the mobile apparatus has previously occupied. This fine-tuning allows a system to propagate through all previous estimations and adjust each change in position and/or orientation accordingly to reach the same position. Such a loop closure algorithm may be considered as a post-processing correction which may involve: first, individual adjustments for the change in position and/or orientation are summed up; parallel to the summation in sensor frequency the loop closure has a graph model in a memory of past key-points as well as a past path with all changes in position and/or orientation. Once a match of the current surrounding with past key-points is found with a pre-determined certainty (e.g., with a required certainty of larger than 95%) the whole graph (i.e., stored adjustments of position and/or orientation) between the current position and the last key-point position may be recursively changed to match itself again. An example of such a loop closure algorithm is described in Kin Leong Ho et al., "Loop closure detection in SPALM by combining visual and spatial appearance", Robotics and Autonomous Systems 54 (2006). 740-749.

LIDAR-based ego-motion estimation algorithms are further described, for example, in Ji Zhang et al., "LOAM: Lidar Odometry and Mapping in Real-time", Conference: Robotics: Science and Systems Conference, 2014, DOI: 10.15607/RSS.2014.X.007, and Ji Zhang et al., "Visual-lidar Odometry and Mapping: Low-drift, robust, and fast", 2015 IEEE International Conference on Robotics and Automation (ICRA), Seattle, Wash., 2015.

SUMMARY

The present disclosure relates to methods, devices, and computer programs for determining a change in a position and/or orientation of a mobile apparatus. The device may be provided in the mobile apparatus.

Technical Problem

SLAM-based algorithms may converge to a local minimum when rotating and translating two consecutive point-clouds of the environment (based on LIDAR measurements, for example) around the mobile apparatus against each other to determine a change in position and/or orientation of the mobile apparatus. This sometimes results in a convergence at a local minimum, which is not the correct position and/or orientation. This error can accumulate and lead to a false ego-motion estimation, sometimes even significantly false ego-motion. That is, while SLAM-based algorithms typically have a high accuracy in estimating a positional and/or oriental change, sometimes the predictions are significantly false (e.g., estimating a wrong direction) which leads to a reduction in robustness.

Most SLAM-based algorithms rely on loops in the recorded sequences to correct offsets and errors in the ego-motion estimation. Automotive tracks are, however, usually from a position A to position B without loops over the same location. Therefore, loop closures cannot be used to correct errors in the algorithm part.

A SLAM-based algorithm that does not use loop closures may add a consecutive transformation, see Shan et al., "LeGO-LOAM: Lightweight and Ground-Optimized Lidar Odometry and Mapping on Variable Terrain". This way, a drift may occur, or an error throws off the algorithm and it cannot correct the estimation once an error has occurred. Other SLAM-based algorithms may additionally use GPS data to periodically check the determined graph (i.e., a change in position and/or orientation over time) and to correct the estimation recursively in a similar fashion to loop closures, see Shan et al. "LIO-SAM: Tightly-coupled Lidar Inertial Odometry via Smoothing and Mapping". However, GPS data are not always available or reliable enough.

There is thus a need to provide an improved way of avoiding error propagation after converging into a false local minimum.

Solution

According to a first aspect, a method of determining a change in a position and/or orientation of a mobile apparatus, includes: acquiring a first data stream indicating a first estimated change in the position and/or orientation of the mobile apparatus in respective ones of a plurality of time frames; acquiring a second data stream indicating a second estimated change in the position and/or orientation of the mobile apparatus in the respective ones of the plurality of time frames, wherein the first data stream has a higher accuracy than the second data stream and the first data stream has a lower robustness than the second data stream; and responsive to a comparison of the first indicated change with the second indicated change in the respective ones of the plurality of time frames, using the first estimated change or the second estimated change to determine the change in the position and/or orientation of the mobile apparatus.

According to a second aspect, the first data stream and the second data stream are independently acquired.

According to a third aspect, the first data stream is acquired from a SLAM-based algorithm, and the second data stream is acquired from an IMU-based sensor or an acceleration sensor of the mobile apparatus.

According to a fourth aspect, the first estimated change indicates a first offset with regard to a previous position and/or previous orientation of the mobile apparatus and the second estimated change indicates a second offset with regard to the previous position and/or previous orientation of the mobile apparatus.

According to a fifth aspect, the method further includes: using the second estimated change if a difference between the first offset and the second offset is larger than or equal to a predetermined threshold; and using the first estimated change if the difference between the first offset and the second offset is smaller than the predetermined threshold.

According to a sixth aspect, the method further includes: using the second estimated change if a difference between the first offset and the second offset is larger than or equal to a predetermined error interval; and using the first estimated change if the difference between the first offset and the second offset is smaller than the predetermined error interval.

According to a seventh aspect, the predetermined threshold is a mobile apparatus specific threshold.

According to an eight aspect, the predetermined error interval is a mobile apparatus specific error interval.

According to a ninth aspect, a device of determining a change in a position and/or orientation of a mobile apparatus, includes: an acquisition unit configured to: acquire a first data stream indicating a first estimated change in the position and/or orientation of the mobile apparatus in respective ones of a plurality of time frames; and acquire a second data stream indicating a second estimated change in the position and/or orientation of the mobile apparatus in the respective ones of the plurality of time frames, wherein the first data stream has a higher accuracy than the second data stream and the first data stream has a lower robustness than the second data stream; and a determination unit configured to: responsive to a comparison of the first indicated change with the second indicated change in the respective ones of the plurality of time frames, use the first estimated change or the second estimated change to determine the change in the position and/or orientation of the mobile apparatus.

According to a tenth aspect, the first data stream and the second data stream are independently acquired.

According to an eleventh aspect, the first data stream is acquired from a SLAM-based algorithm, and the second data stream is acquired from an IMU-based sensor or an acceleration sensor of the mobile apparatus.

According to a twelfth aspect, the first estimated change indicates a first offset with regard to a previous position and/or previous orientation of the mobile apparatus and the second estimated change indicates a second offset with regard to the previous position and/or previous orientation of the mobile apparatus.

According to a thirteenth aspect, the determination unit is further configured to: use the second estimated change if a difference between the first offset and the second offset is larger than or equal to a predetermined threshold; and use the first estimated change if the difference between the first offset and the second offset is smaller than the predetermined threshold.

According to a fourteenth aspect, the determination unit is further configured to: use the second estimated change if a difference between the first offset and the second offset is larger than or equal to a predetermined error interval; and use the first estimated change if the difference between the first offset and the second offset is smaller than the predetermined error interval.

According to a fifteenth aspect, a mobile apparatus includes the device of any one of the ninth aspect to the fourteenth aspect.

According to a sixteenth aspect, a computer program comprising instructions which, when the program is executed by a computer, causes the computer to carry out the method of any one of the first aspect to the eight aspect.

DETAILED DESCRIPTION

Aspects of the present disclosure will now be described in reference to the enclosed figures. In the following detailed description, numerous specific details are set forth. These specific details are only to provide a thorough understanding of the various described aspects. Further, although the terms first, second, etc. may be used to describe various elements, these elements should not be limited by these terms. These terms are only used to distinguish one element from another.

Figure 1:
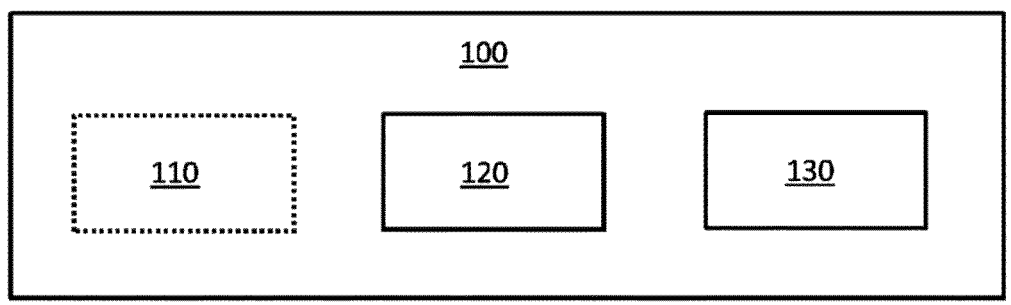
FIG. 1 shows a device according to an aspect of the present disclosure.
Figure 2:
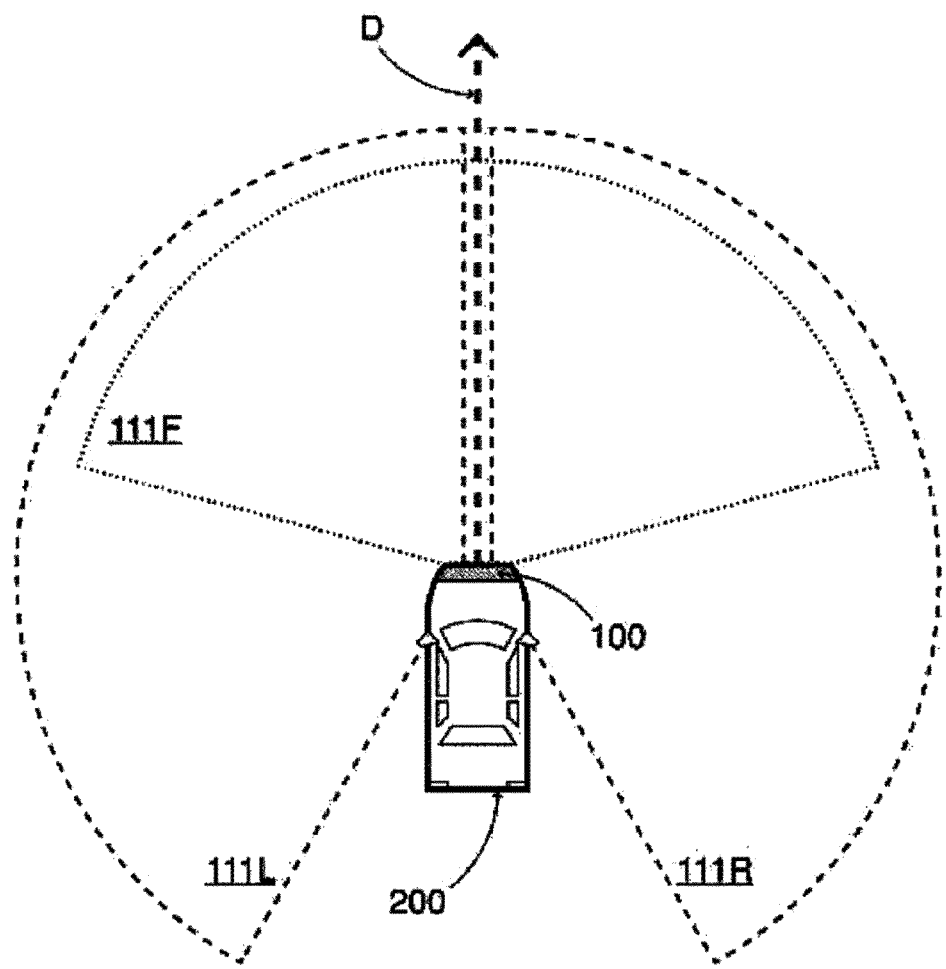
FIG. 2 shows a device according to an aspect of the present disclosure for determining a change in a position and/or orientation of a mobile apparatus (vehicle).

FIG. 1 shows a device 100 according to an aspect of the present disclosure for determining a change in a position and/or orientation of a mobile apparatus. The device 100 may be provided to a mobile apparatus 200 (for example, a vehicle) as shown in FIG. 2 and may be mounted on the mobile apparatus 200 facing a driving direction of the mobile apparatus.

The skilled person understands that it is not required that the device 100 faces the driving direction D; the device 100 can also face to a side direction or to a rear direction or be placed somewhere within the mobile apparatus receiving data streams related to sensors and/or algorithms, as will be further explained below. For example, the device 100 may be related to a LIDAR-type sensor, a LIDAR-type module, part of a LIDAR-type system or the like. The device 100 may have a plurality of detection areas, for example be orientated such that it has a forward detection area 111F, a left detection area 111L and/or a right detection area 111R as shown in FIG. 2. In addition, an extension of the detection areas (such as a near field detection area, far field detection area) may differ. The skilled person understands that this is not a limiting configuration, and the device may also be related to a 360° rotating LIDAR sensor, for example, with a uniform horizontal resolution which offers a continuous detection area around the mobile apparatus (e.g., ego-vehicle).

A mobile apparatus 200 may be any land vehicle that is moved by machine, electric or hydrogen-based power. Such a mobile apparatus 200 may also be tied to floating, diving or airborne. The figures exemplify this mobile apparatus 200 as a vehicle such as car, with which the device 100 is provided. The present disclosure is, however, not limited thereto. Hence, the device 100 may also be mounted to, for example, a robot, a lorry, a truck, a farming vehicle, a motorbike, a bus, an aircraft, a drone, a boat, a ship or the like.

As illustrated in FIG. 1, the device 100 includes an acquisitioning unit 120 and a determining unit 130 and may additionally include one or more data stream generation units 110, but the one or more data stream generation units may also be provided separate to the device 100. Here, the one or more data stream generation units may be related to different sensors and/or data processing units applying algorithms (such as a SLAM-based algorithm) to sensor data.

Figure 3:
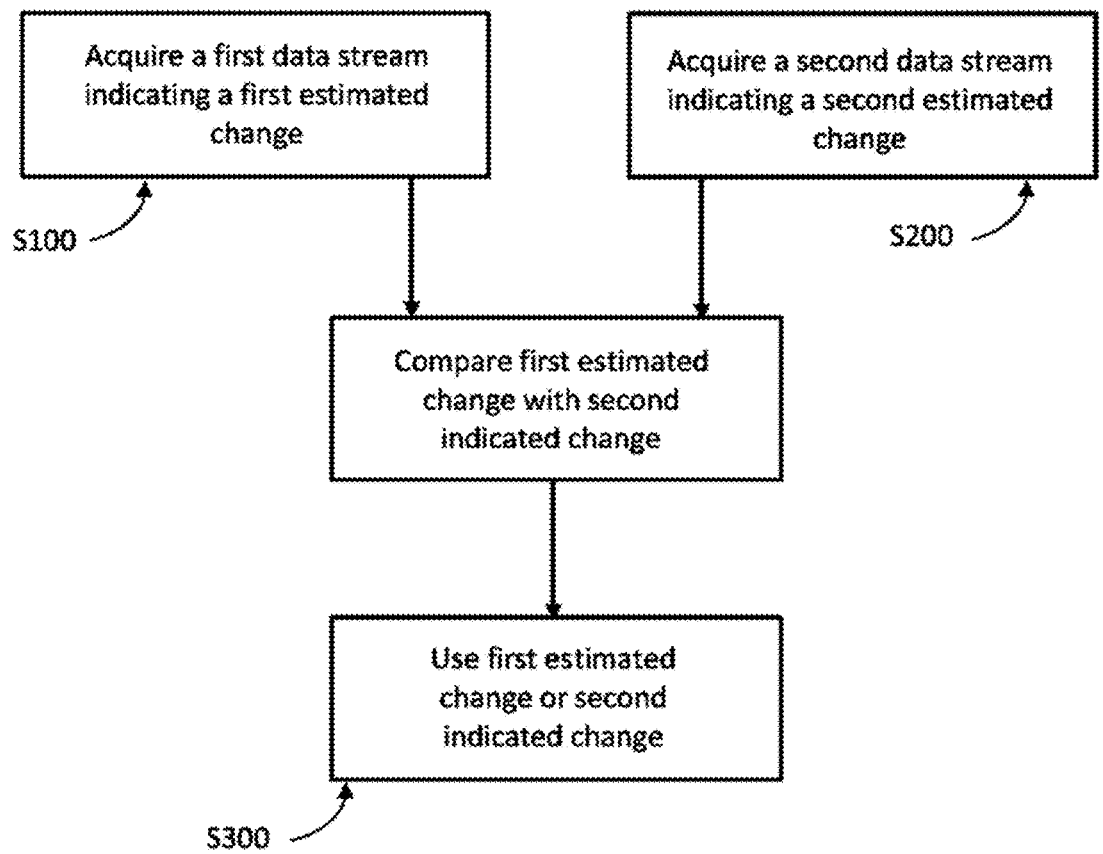
FIG. 3 shows a flow chart of a method according to an aspect of the present disclosure.

FIG. 3 shows steps of a method of determining a change in a position and/or orientation of such a mobile apparatus, as it is performed by the device 100. As illustrated in FIG. 3, the method includes a step S100 of acquiring, by the acquisition unit 120, a first data stream indicating a first estimated change in the position and/or orientation of the mobile apparatus (in other words, a first ego-motion of the mobile apparatus) in respective ones of a plurality of time frames.

Here, the plurality of time frames defines respective time points $t_1, t_2, t_3, \ldots, t_N$ for which the changes in the position and/or orientation of the mobile apparatus are estimated; that is, the first data stream indicates first estimated changes in position $\Delta r^1$ in a temporal sequence of $\Delta r^1(t_1), \Delta r^1(t_2), \ldots, \Delta r^1(t_N)$ and/or first estimated change in orientation $\Delta o^1$ in a temporal sequence of $\Delta o^1(t_1), \Delta o^1(t_2), \ldots, \Delta o^1(t_N)$. The respective time points $t_i$ may be defined with predetermined time intervals, which may be equal to or lower than 1 s, between adjacent time frames, such as between $t_i$ and $t_{i+1}$, thus defining an acquisition frequency of at least 1 Hz.

This is not limiting. For an application on a larger scale, e.g., inland shipping or some other application with a slower timeframe and less focus on real time, it is alternatively possible to apply this method on sensor streams with a lower frequency (less than 1 Hz), as long as the respective time points are at the lower frequency of the two utilized sensor streams to be able to compare both data streams.

The method further includes a step S200 of acquiring, by the acquisition unit 120, a second data stream indicating a second estimated change in the position and/or orientation of the mobile apparatus in the respective ones of the plurality of time frames. The second data stream may be acquired in parallel with the first data stream. Here, the second data stream indicates second estimated changes in position $\Delta r^e$ in a temporal sequence of $\Delta r^2(t_1), \Delta r^2(t_2), \ldots, \Delta r^2(t_N)$ and/or second estimated change in orientation $\Delta o^2$ in a temporal sequence of $\Delta o^2(t_1), \Delta o^2(t_2), \ldots, \Delta o^2(t_N)$ (in other words, a second separate ego-motion of the mobile apparatus).

Here, the first data stream may have a higher accuracy than the second data stream and the first data stream may have a lower robustness than the second data stream. An example of the first data stream is a data stream output from a SLAM-based algorithm operating on sensor data of a LIDAR-type sensor system. Further, an example of the second data stream are sensor data of one or more acceleration sensors of, for example, a HOST sensor. The skilled person understands that these examples are used to describe the concept of the present disclosure, but that the general concept can be applied to other data stream sources as well.

The skilled person understands that accuracy may be defined as a closeness of the estimated change in position and/or orientation to the actual change in position and/or orientation of the mobile apparatus. That is, if the actual change in position and/or orientation of the mobile apparatus is referred to as $\Delta r^{act}$ and $\Delta o^{act}$, respectively, then the accuracy defines how close the estimated value $\Delta r^1$ or $\Delta r^2$ is to the actual value $\Delta r^{act}$. Ideally, the estimation in the change in position should be identical to the actual change in position, i.e., $\Delta r^{1,2} = \Delta r^{act}$ (similar for the change in orientation). In praxis, however, there is a deviation between $\Delta r^{1,2}$ and $\Delta r^{act}$, and here the first data stream generally has a higher accuracy than the second data stream, which means that a deviation of the first data stream from the actual value is generally smaller than a deviation of the second data stream from the actual value, for example, Equations (1) and (2):

$$|\Delta r^1 - \Delta r^{act}| \leq |\Delta r^2 - \Delta r^{act}| \tag{1}$$

$$|\Delta o^1 - \Delta o^{act}| \leq |\Delta o^2 - \Delta o^{act}| \tag{2}$$

Here, the expression |•| in Eqs. (1) and (2) refers to the absolute value.

The skilled person further understands that robustness may be defined as a measure of reliability, in particular a robustness to still provide reliable estimations with regard to changes in position and/or orientation even under unfavourable conditions. Here, the nature of the first data stream is such that unfavourable environmental conditions of a mobile apparatus may lead to the acquisition of point-clouds or the like (for example in LIDAR-based point-clouds) in which a processing of consecutive point-clouds may result in an incorrect local minimum. Such a situation may occur rarely or only in particular situations but has the effect that estimation in the change of position and/or orientation is significantly incorrect (such as estimating a wrong direction or the like). This means that in such (rare) conditions a deviation of the first data stream from the actual value becomes much larger than a deviation of the second data stream from the actual value, for example, Equations (3) and (4):

$$|\Delta r^1 - \Delta r^{act}| >> |\Delta r^2 - \Delta r^{act}| \qquad (3)$$

$$|\Delta o^1 - \Delta o^{act}| >> |\Delta o^2 - \Delta o^{act}| \qquad (4)$$

The method further includes a step S300, performed by the determination unit 130, in which, responsive to a comparison of the first indicated change, $\Delta r^1$ and/or $\Delta o^1$, with the second indicated change, $\Delta r_2$ and/or $\Delta o^2$, in the respective ones of the plurality of time frames $t_1, t_2, t_3 \ldots$, the first estimated change or the second estimated change is used to determine the change in the position and/or orientation of the mobile apparatus. That is, starting from an original position $r_0$ and/or an original orientation $o_0$, a third data stream ($r^3, o^3$) is determined in which the new position and/or orientation of the mobile apparatus at each of subsequent time frames $t_i$ is determined by using either the first indicated change or the second indicated change, resulting, for example, in a third data sequence for the position of the mobile apparatus:

$$r^3: r_0 \rightarrow r_1 (= r_0 + \Delta r^1) \rightarrow r_2 (= r_1 + \Delta r^1) \rightarrow r_3 (= r_2 + \Delta r^2) \rightarrow \ldots \rightarrow r_{i+1} (= r_i + \Delta r^1)$$

in which the second position $r_2$ at $t_2$ in the sequence $r^3$ is determined using a positional change as indicated by the second data stream while the other positions in the sequence $r^3$ are determined using a positional change as indicated by the first data stream. The skilled person understands that this example is a non-limiting example for the purpose of illustrating the advantageous usage of either the first estimated change or the second estimated change.

It is further noted that the third data stream with regard to orientation $o^3$ does not necessarily have to follow the third data stream with regard to position in the sense that different combinations of the first and second data stream may be used, resulting, for example, in a third data sequence for the orientation of the mobile apparatus:

$$o^3: o_0 \rightarrow o_1 (= o_0 + \Delta o^1) \rightarrow o_2 (= o_1 + \Delta o^2) \rightarrow o_3 (= o_2 + \Delta o^2) \rightarrow \ldots \rightarrow o_{i+1} (= o_i + \Delta o^1)$$

in which the second and third orientation $o_2$ at $t_2$ and $o_3$ at $t_3$, respectively, in the sequence $o^3$ is determined using an oriental change as indicated by the second data stream while the other orientations in the sequence are determined using an oriental change as indicated by the first data stream. The skilled person understands that also this example is a non-limiting example for the purpose of illustrating the advantageous usage of either the first estimated change or the second estimated change. In particular, the exclusive use of either the first data stream or the second data stream for each of subsequent time frames $t_i$ can be independently controlled for the determination of positional and oriental change of the mobile apparatus.

In general, the problem of error propagation after converging into a false local minimum is thus solved by comparing the first data stream (first ego-motion) with a separate second data stream (second ego-motion) at respective time frames and using the more appropriate data stream (being more accurate or more robust) at a present time frame.

Figure 4:
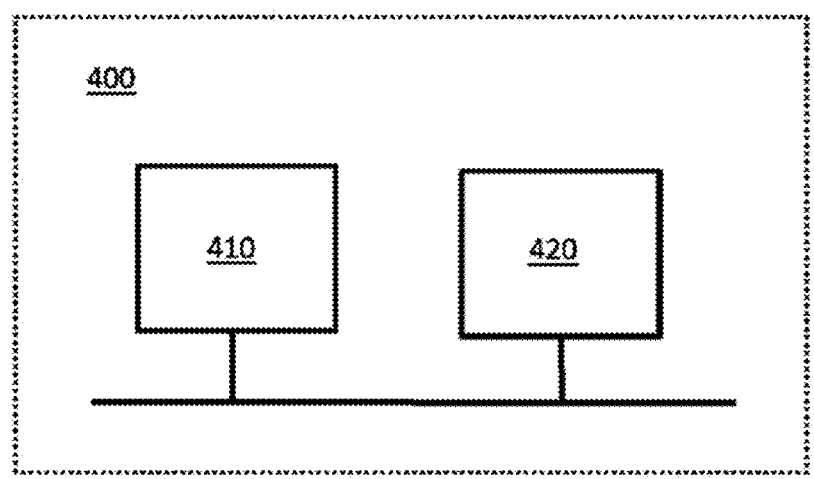
FIG. 4 shows a computer according to an aspect of the present disclosure.

The method illustrated in FIG. 3 and further detailed above may be a computer-implemented method of the device 100. This method may be stored as a computer program in the memory 410 of a computer 400, which may be a board computer of the mobile apparatus (e.g., vehicle or of robot), a computer of a device, a radar sensor, a radar system, a LIDAR sensor, a LIDAR system, a HOST sensor or the like and may be executed by a processor 420 of the computer 400 as depicted in FIG. 4.

The first data stream and the second data stream may be independently acquired, e.g., may be acquired from independent or different data sources. For example, the first data stream and the second data stream may be acquired from different sensors of the mobile apparatus. The first data stream and the second data stream may further be acquired from different algorithms applied to sensor data of different sensors.

For example, the first data stream may be acquired from a SLAM-based algorithm (applied to, for example, point-cloud sensor data) and the second data stream is acquired from an IMU-based sensor or an acceleration sensor of the mobile apparatus.

For example, the information regarding the second data stream can be acquired from either a simple IMU/acceleration sensor inside the mobile apparatus or from a direct measurement, e.g., of the steering wheel angle and the wheel rotation. The information may come directly from the CAN bus of the mobile apparatus (e.g., vehicle or robot) and is—in general—very reliable/robust, as the information gets provided to advanced driver assistant systems ADAS.

The second data stream may thus also provide information about the velocity, yaw, pitch and roll of the apparatus. While these information streams are very reliable/robust, the precision results in a coarser ego-motion estimation as compared to an ego-motion estimation using a SLAM-based algorithm (first data stream). In general, the second data stream information is very robust as in they are going in the right direction (as compared to the SLAM-based algorithm which may go in a wrong direction, e.g., based on an inappropriate local minimum solution). But second data stream information is not as precise as the second data stream information using a SLAM-based algorithm. With each consecutive time step or time frame, the resulting ego-motion due to the second data stream drifts off more from the real position of the mobile apparatus. The present inventors have, however, realized that for short term estimations, the resulting ego-motion due to the second data stream can be advantageously used (as will be further explained below), even if after a few seconds the drift accumulates to multiple meters offset.

In aspects, the first estimated change may indicate a first offset with regard to a previous position and/or previous orientation of the mobile apparatus and the second estimated change may indicate a second offset with regard to the previous position and/or previous orientation of the mobile apparatus. That is, the estimated changes at a time frame $t_{i+1}$ may be defined as a relative offset with regard to a previous time frame $t_i$.

Alternatively, the estimated changes at a time frame $t_{i+1}$ may be defined as a relative offset (relative change) with regard to a previous time frame $t_1$ in the third data stream, for example:

$$\Delta r^1 = r^1(t_{i+1}) - r^3(t_i) \qquad (5)$$

$$\Delta o^1 = o^1(t_{i+1}) - o^3(t_i) \qquad (6)$$

$$\Delta r^2 = r^2(t_{i+1}) - r^3(t_i) \qquad (7)$$

$$\Delta o^2 = o^2(t_{i+1}) - o^3(t_i) \qquad (8)$$

According to an aspect the second estimated change is used for the third data stream if a difference between the first offset and the second offset, e.g., given by $|\Delta r^1 - \Delta r^2|$, is larger than or equal to a (absolute) predetermined threshold, and the first estimated change is used for the third data stream if the difference between the first offset and the second offset is smaller than the predetermined threshold.

That is, given that the first data stream has a higher accuracy than the second data stream, at least on average, the difference between the first offset and the second offset is smaller than the predetermined threshold indicating that the first data stream provides more accurate estimates as to changes in position and/or orientation. Here, the predetermined threshold may be based on a difference in estimation accuracy for the first and second data streams, which may depend on the different data sources for the first and second data streams and/or different algorithms used to generate the first and second data streams and may thus also be dependent on the type of mobile apparatus.

Further, given that the second data stream and the first data stream has a lower robustness than the second data stream, for example when the first data stream is acquired from a SLAM-based algorithm and the second data stream is based on acceleration data of a sensor of the mobile apparatus, in some cases (for example, under difficult environmental conditions) the difference between the first offset and the second offset is larger than or equal to the predetermined threshold, for example if the first data stream indicates an estimated change in a wrong direction. In such cases the second estimates change is used for the third data stream.

According to another aspect, the second estimated change is used for the third data stream if a difference between the first offset and the second offset is larger than or equal to a predetermined error interval (relative error offset) and the first estimated change is used if the difference between the first offset and the second offset is smaller than the predetermined error interval. According to this aspect, the difference between the first offset and the second offset may be determined relative to one of the first offset or the second offset. In a non-limiting example, the predetermined error interval may be ±5% (reflecting a time interval of 0.1 s).

Figure 5A:
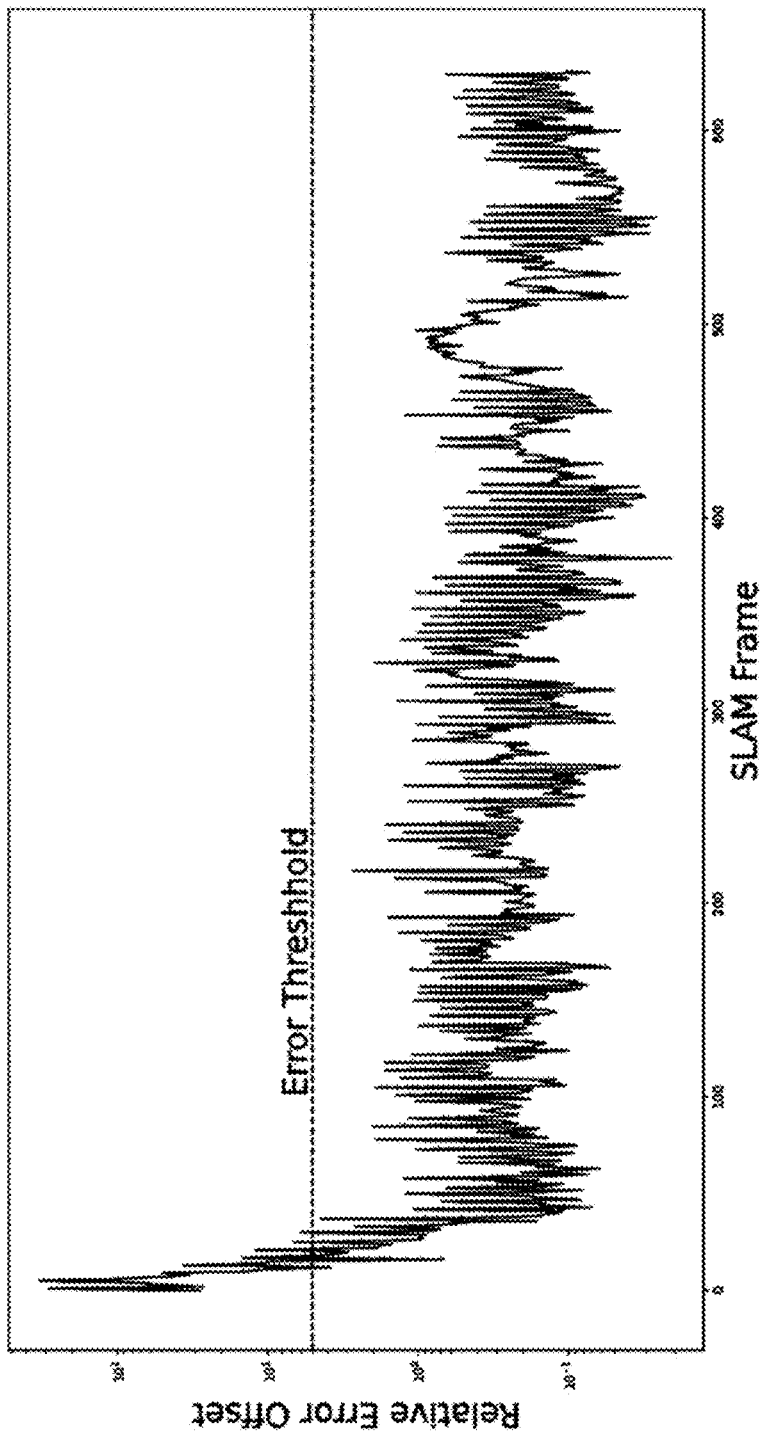
FIG. 5A shows a first example of a relative error offset between the first estimated change and the second estimated change as a function of time frames.

FIG. 5A shows a first example of a relative error offset (predetermined error interval) between the first estimated changes and the second estimated changes as a function of time frames (referred to as frames here). In this example, the first data stream is generated from a SLAM-based algorithm of LIDAR sensor data of a vehicle, while the second data stream is generated by a HOST-sensor including acceleration sensors of the vehicle. The time frames (SLAM frames) have a time interval of 0.1 second (corresponding to an acquisition frequency of 10 Hz) and the relative error offset is set at ±5%. As illustrated, the relative difference between the first and second estimated changes is larger than the relative error offset of ±5% for the initial time frames and remains below the relative error offset for the remaining times frames. This means that the SLAM-based first data stream is initially not used to estimate the position and/or orientation of the vehicle as these estimates are not robust enough.

Figure 5B:
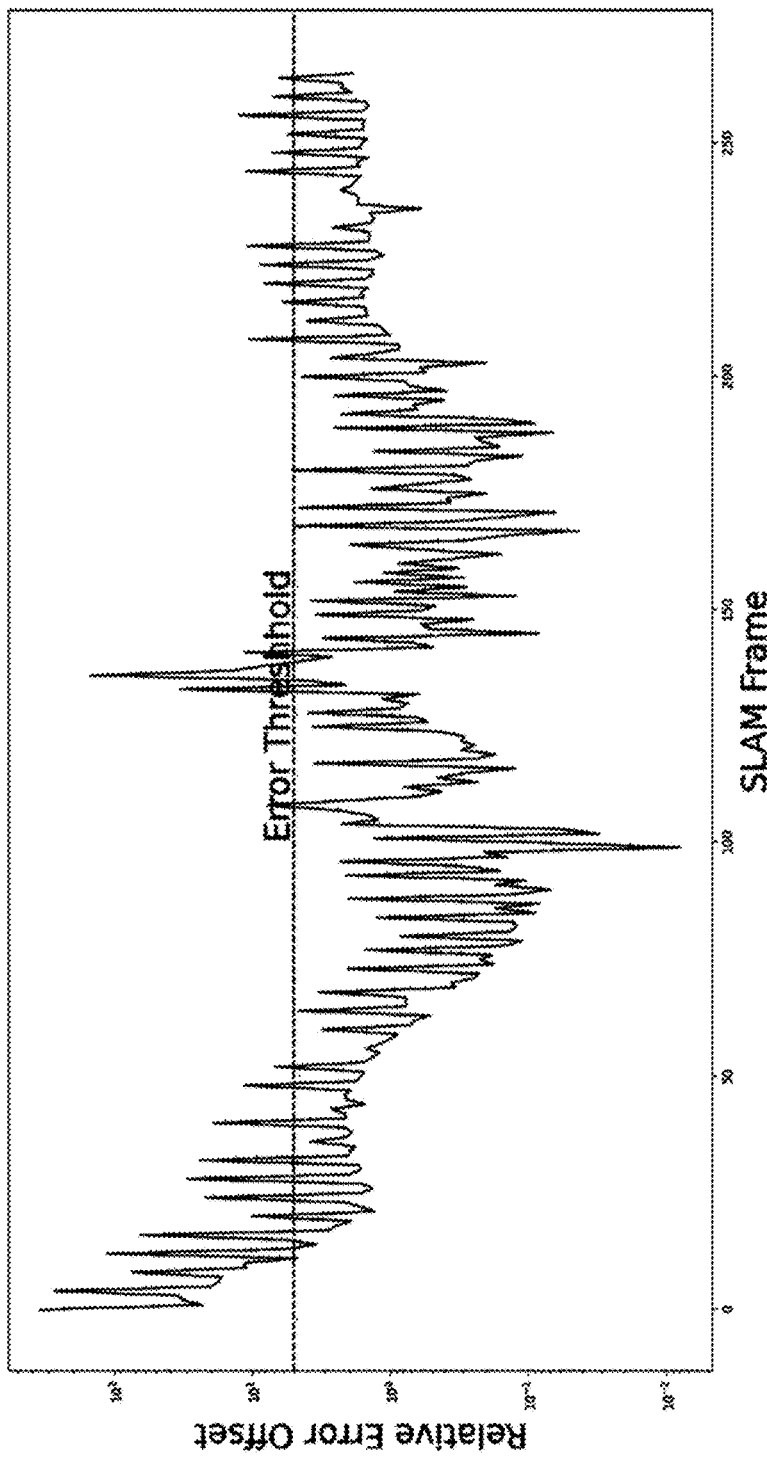
FIG. 5B shows a second example of a relative error offset between the first estimated change and the second estimated change as a function of time frames.

FIG. 5B shows a second example of a relative error offset (predetermined error interval) between the first estimated change and the second estimated change as a function of time frames. As in FIG. 5A, the first data stream is generated from the SLAM-based algorithm of LIDAR sensor data of the vehicle, while the second data stream is generated by the HOST-sensor including acceleration sensors of the vehicle. In this second example, the relative difference between the first and second estimated changes is not only larger than the relative error offset of ±5% for initial time frames, but notably also around a time frame of about 140, and may also again become larger for subsequent time frames (in fact, fluctuate between values larger and smaller than the relative error offset). As such, the relative difference between the first offset of the first data stream and the second offset of the second data stream may dynamically be larger or smaller than the predetermined error interval, and thus the contribution of the first estimated change or the second estimated change to the position and/or orientation of the mobile apparatus (as reflected in the third data stream) also dynamically changes.

The predetermined threshold or the predetermined error interval may be a mobile apparatus specific value, in particular to reflect that the data acquisition methodologies depend on specific sensor types (e.g., LIDAR, acceleration sensors, inertial measurement unit (IMU) sensors) and/or specific algorithms which may vary between different types of mobile apparatuses. Here, the predetermined threshold or the predetermined error interval may be predetermined based on actual experimental data series acquired for the specific mobile apparatuses. The predetermined threshold or the predetermined error interval may also be predetermined or learned with regard to specific geographical areas, reflecting the recognition that SLAM-based algorithms may be more susceptible to running into false local minima solutions in urban areas rather than in non-urban areas.

In other words, all ego-motion estimations have an offset after a while; even the almost perfect SLAM algorithms (used for generating the first data stream) experience a certain drift. By comparison, the second data stream experiences a higher drift and is therefore not appropriate for long-term ego-motion estimations. However, the present inventors have realized that the second data stream can advantageously be used to check the short-term estimation and make sure other estimations go in the right direction.

Further, the determination unit 130 of the device 100 is configured to, responsive to a comparison of the first indicated change with the second indicated change in the respective ones of the plurality of time frames, use the first estimated change or the second estimated change to determine the change in the position and/or orientation of the mobile apparatus.

Here, as the data of the second data stream is more reliable (more robust) than the data of the first data stream, the resulting ego-motion of the first data stream (e.g., based on a SLAM algorithm) is compared with the resulting ego-motion of the second data stream for short intervals (predetermined time intervals may be 1 s or less, resulting in an acquisition frequency of at least 1 Hz). In an aspect, it may be assumed, that both ego-motion estimations start from the same position. At the end of the time interval the offset of both estimations is compared. If the first data stream (e.g., based on a SLAM algorithm) has a positional and/or rotational offset of less than the predetermined error interval (e.g., ±5%) it can be assumed that the SLAM-based algorithm is working as expected and yields a good result, which is better than the ego-motion estimation as indicated by the second data stream.

The ±5% relative error offset is an example of an error interval used in a 10 Hz correction. The skilled person understands that this is a non-limiting example and that other error intervals may be applied for different correction frequencies (different time frame intervals).

As explained above, if the offset is larger than 5%, it has to be assumed, that the first data stream (e.g., based on a SLAM algorithm) has converged to a false minimum in one of the time frames in this interval. Therefore, the relative ego-motion of this time interval is replaced with the relative ego-motion estimation according to the second data stream of the same interval. Since the given time intervals are continuously compared with neglectable additional computational effort, this periodical determination can efficiently be executed online (i.e., live inside the mobile apparatus, in particular without the additional usage of Kalman filters, or the like) to continuously fix the ego-motion estimation and replace one or more sections of the first data (SLAM) stream with the second data stream when the offset is too large), e.g., simultaneously to the SLAM ego motion estimation.

Figure 6A:
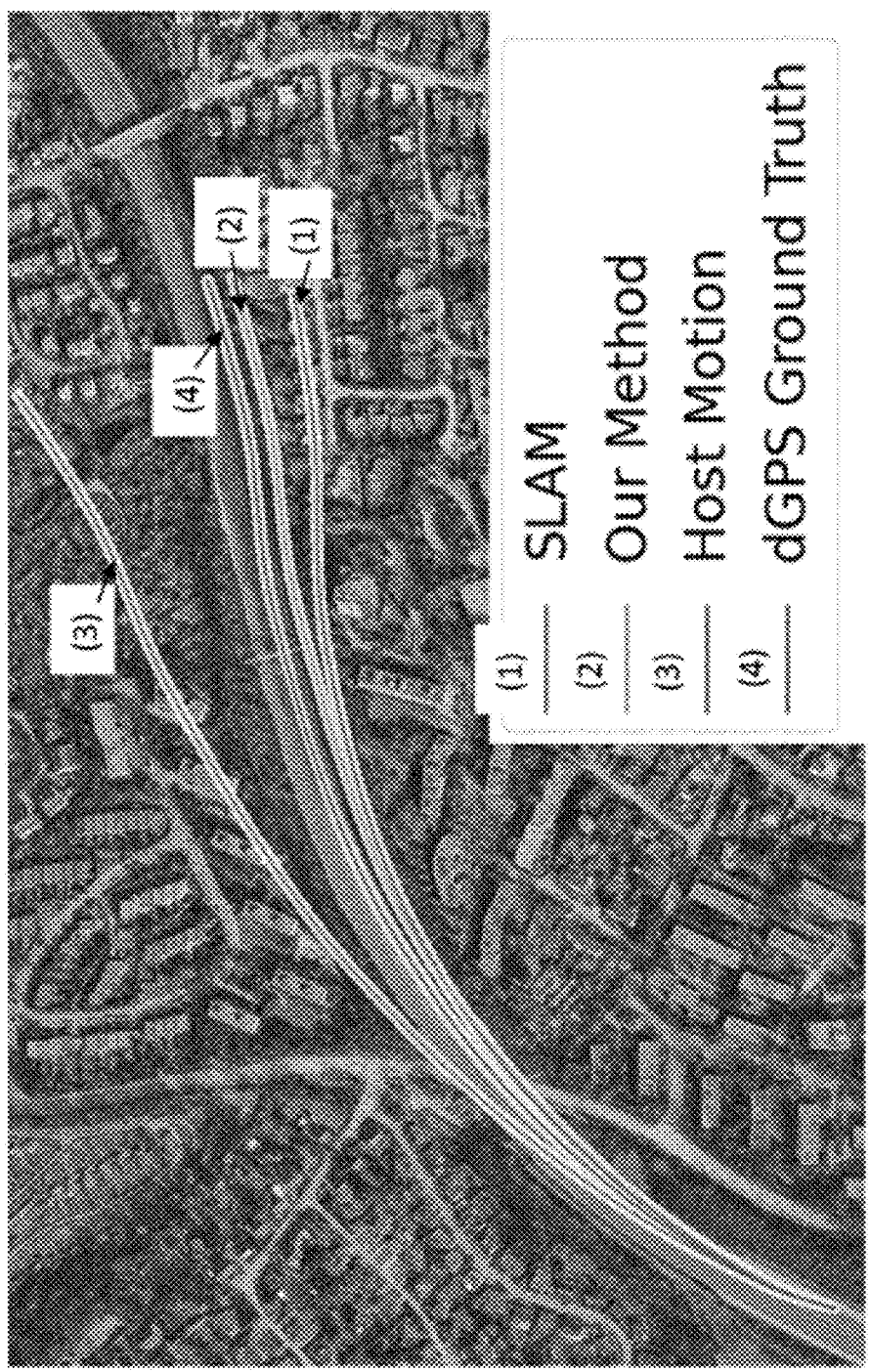
FIG. 6A shows a first example of a comparison between the determination of the position of a vehicle according to the (1) first data stream (SLAM-based algorithm), (2) the present approach as described in the detailed description and defined in the claims, (3) the second data stream (Host-data based), and (4) the position as determined based on GPS data.

FIG. 6A shows a first example of a comparison between the determination of the position of a vehicle according to the (1) first data stream (SLAM-based algorithm), (2) the present approach as described above and defined herein, (3) the second data stream (Host-data (acceleration sensor) based), and (4) the position as determined based on GPS data. This first example represents a highway log, which provides no loops for the loop-closure step for the SLAM-based (e.g., LegoLOAM) algorithm. While the (1) first data stream (SLAM-based algorithm) generally has a lower drift as compared to the (3) the second data stream, it can be taken from this example that the above described decision to either use an indicated change indicated by the first data stream or the second data stream results in a more accurate prediction of the positional changes of the vehicle as compared to the actual positional changes (determined here on the basis of GPS data). The appropriate alternative combination of the first and second data streams thus enables a very close match of the real underlying track.

Figure 6B:
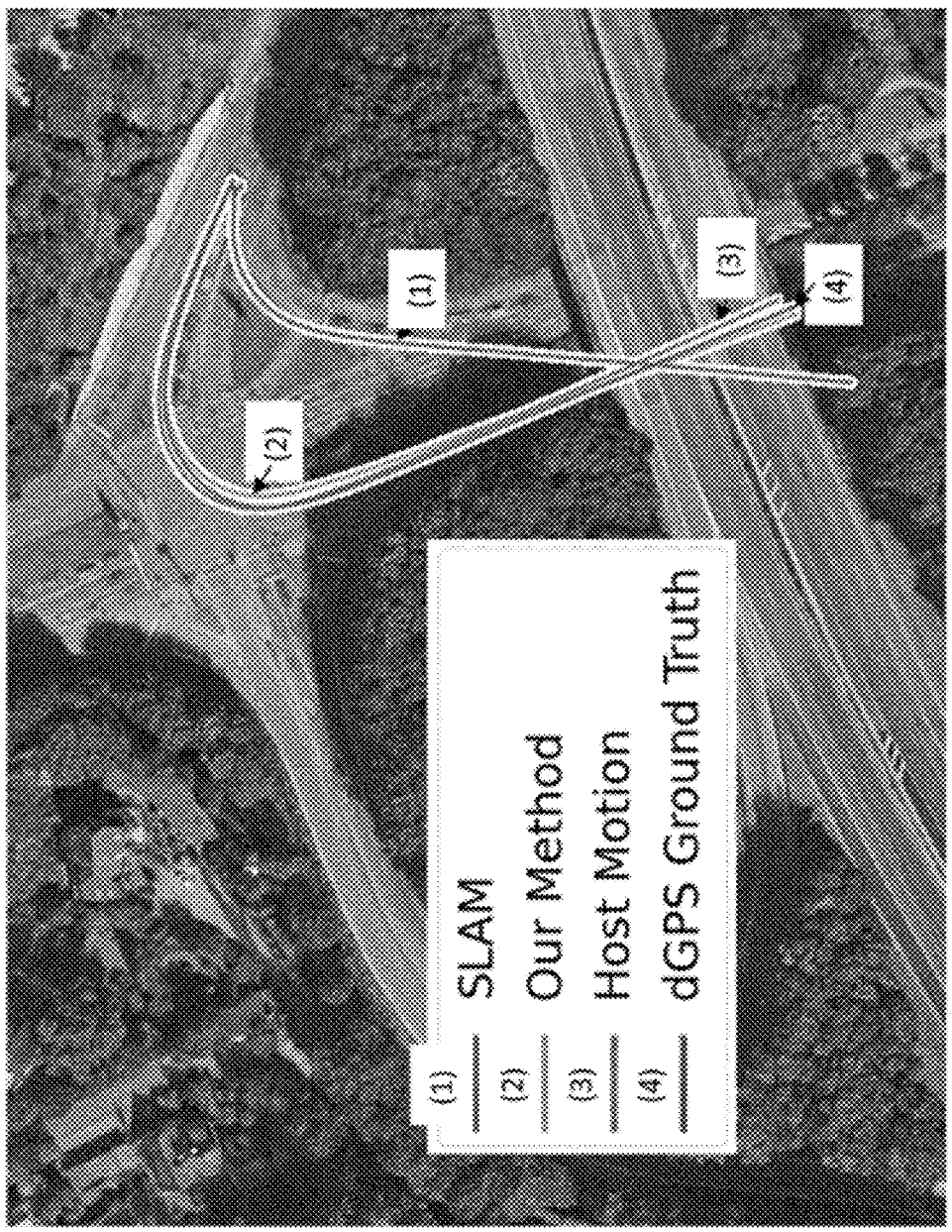
FIG. 6B shows a second example of a comparison between the determination of the position of a vehicle according to the (1) first data stream (SLAM-based algorithm), (2) the present approach as described in the detailed description and defined in the claims, (3) the second data stream (Host-data based), and (4) the position as determined based on GPS data.

FIG. 6B shows a second example of a comparison between the determination of the position of a vehicle according to the (1) first data stream (SLAM-based algorithm), (2) the present approach as described above and defined in the claims, (3) the second data stream (Host-data (acceleration sensor) based), and (4) the position as determined based on GPS data.

This second example represents an inner-city situation, which also provides no loops for the loop-closure step for the SLAM-based (e.g., LegoLOAM) algorithm. This second example shows a particular case in which the (1) first data stream (SLAM-based algorithm) has a significant initial robustness problem indicating a significantly wrong direction of the vehicle, as compared to (3) the second data stream. Notably, the above described decision to either use an indicated change indicated by the first data stream or the second data stream still can result in a more accurate prediction of the positional changes of the vehicle as compared to the actual positional changes (determined here on the basis of GPS data), in particular it can correct the errors introduced by the SLAM-based algorithm even without the presence of loops. Again, while showing clear signs of long-term offsets, the corrected ego-motion fits the real path much closer than the pure second data stream ego-motion or the pure first data stream ego-motion.

While prior solutions thus rely on the availability of loops in the recording data the present disclosure uses a separate data source which offers online reliability checks to the SLAM-based results of the first data stream.

The present disclosure thus enables the online use of all general-purpose SLAM-based algorithms for mobile (e.g., automotive or robotic) tracks which offer no loop closures to correct the ego-motion estimation. This correction is thus no longer limited to inner city tracks, with prominent landmarks but this can extended reliably to ego-motion estimations to all kind of roads or situations. Due to the omnipresence of second data streams (due to acceleration sensors or the like) it is thus possible to rely on this data stream even in situations which do not allow other sensor sources to play a similar role (e.g., GPS/DGPS cannot provide sufficient data in obstructed areas such as tunnels or between high rise buildings, camera sensors are prone to bad visual situations and IMU modules have to be integrated into the system and are too costly to use in a series production).

It will be apparent to those skilled in the art that various modifications and variations can be made in the entities and methods of this disclosure as well as in the construction of this disclosure without departing from the scope or spirit of the disclosure.

The disclosure has been described in relation to particular aspects which are intended in all aspects to be illustrative rather than restrictive. Those skilled in the art will appreciate that many different combinations of hardware, software and/or firmware will be suitable for practicing the present disclosure.

Moreover, other aspects and implementations of the disclosure will be apparent to those skilled in the art from consideration of the specification and practice of the disclosure disclosed herein. It is intended that the specification and the examples be considered as exemplary only. To this end, it is to be understood that inventive aspects lie in less than all features of a single foregoing disclosed implementation or configuration. Thus, the true scope and spirit of the disclosure is indicated by the following claims.

What is claimed is:

1. A method comprising:
    acquiring a first data stream, the first data stream indicating a first estimated change in at least one of a position or an orientation of a mobile apparatus in respective ones of a plurality of time frames, the first estimated change indicating a first offset with regard to at least one of a previous position or a previous orientation of the mobile apparatus;
    acquiring a second data stream, the second data stream indicating a second estimated change in the at least one of the position or the orientation of the mobile apparatus in the respective ones of the plurality of time frames, the second estimated change indicating a second offset with regard to the at least one of the previous position or the previous orientation of the mobile apparatus, the first data stream having a higher accuracy in indicating the first estimated change in the at least one of the position or the orientation when compared to an actual change in the at least one of the position or the orientation than the second data stream in indicating the second estimated change in the at least one of the position or the orientation, and the first data stream having a lower reliability in indicating the first estimated change in the at least one of the position or the orientation than the second data stream in indicating the second estimated change in the at least one of the position or the orientation;
    determining a difference between the first offset and the second offset; and
    determining a change in the at least one of the position or the orientation of the mobile apparatus by using the first estimated change to determine the change in the at least one of the position or the orientation of the mobile apparatus if the difference between the first offset and the second offset is smaller than the predetermined threshold and using the second estimated change to determine the change in the at least one of the position or the orientation of the mobile apparatus if the difference between the first offset and the second offset is larger than or equal to a predetermined threshold.

2. The method of claim 1, wherein the first data stream and the second data stream are independently acquired.

3. The method of claim 1, wherein the first data stream is acquired from a simultaneous localization and mapping (SLAM) based algorithm.

4. The method of claim 1, wherein the second data stream is acquired from at least one of an inertial measurement unit (IMU) based sensor or an acceleration sensor of the mobile apparatus.

5. The method of claim 4, wherein the first data stream is acquired from a simultaneous localization and mapping (SLAM) based algorithm.

6. The method of claim 1, wherein the predetermined threshold is a mobile apparatus specific threshold.

7. The method of claim 1, further comprising:
using the second estimated change to determine the change in at least one of the position or orientation of the mobile apparatus if the difference between the first offset and the second offset is larger than or equal to a predetermined error interval; and
using the first estimated change to determine the change in at least one of the position or orientation of the mobile apparatus if the difference between the first offset and the second offset is smaller than the predetermined error interval.

8. The method of claim 7, wherein the predetermined error interval is a mobile apparatus specific error interval.

9. A device comprising:
an acquisition unit, the acquisition unit configured to:
acquire a first data stream, the first data stream indicating a first estimated change in at least one of a position or an orientation of a mobile apparatus in respective ones of a plurality of time frames, the first estimated change indicating a first offset with regard to at least one of a previous position or a previous orientation of the mobile apparatus; and
acquire a second data stream, the second data stream indicating a second estimated change in the at least one of the position or the orientation of the mobile apparatus in the respective ones of the plurality of time frames, the second estimated change indicating a second offset with regard to the at least one of the previous position or the previous orientation of the mobile apparatus, the first data stream having a higher accuracy in indicating the first estimated change in the at least one of the position or the orientation when compared to an actual change in the at least one of the position or the orientation than the second data stream in indicating the second estimated change in the at least one of the position or the orientation, and the first data stream having a lower reliability in indicating the first estimated change in the at least one of the position or the orientation than the second data stream in indicating the second estimated change in the at least one of the position or the orientation; and
a determination unit configured to:
determine a difference between the first offset and the second offset;
determine a change in the at least one of the position or orientation of the mobile apparatus by using the first estimated change to determine the change in the at least one of the position or the orientation of the mobile apparatus if the difference between the first offset and the second offset is smaller than the predetermined threshold and using the second estimated change to determine the change in the at least one of the position or the orientation of the mobile apparatus if the difference between the first offset and the second offset is larger than or equal to a predetermined threshold.

10. The device of claim 9, wherein the first data stream and the second data stream are independently acquired.

11. The device of claim 9, wherein the first data stream is acquired from a simultaneous localization and mapping (SLAM) based algorithm.

12. The device of claim 9, wherein the second data stream is acquired from at least one of an inertial measurement unit (IMU) based sensor or an acceleration sensor of the mobile apparatus.

13. The device of claim 12, wherein the first data stream is acquired from a simultaneous localization and mapping (SLAM) based algorithm.

14. The device of claim 9, wherein the determination unit is further configured to:
use the second estimated change to determine the change in at least one of the position or orientation of the mobile apparatus if the difference between the first offset and the second offset is larger than or equal to a predetermined error interval; and
use the first estimated change to determine the change in at least one of the position or orientation of the mobile apparatus if the difference between the first offset and the second offset is smaller than the predetermined error interval.

* * * * *